H. MATOBA.
TRACK GAUGE AND LEVEL.
APPLICATION FILED JULY 18, 1921.

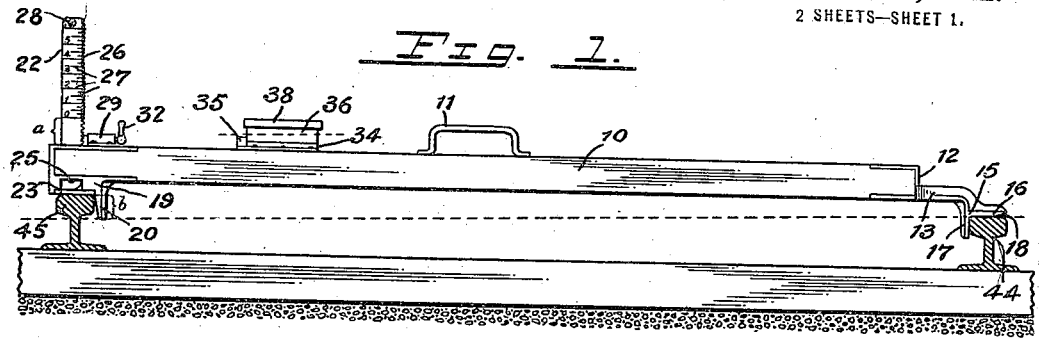
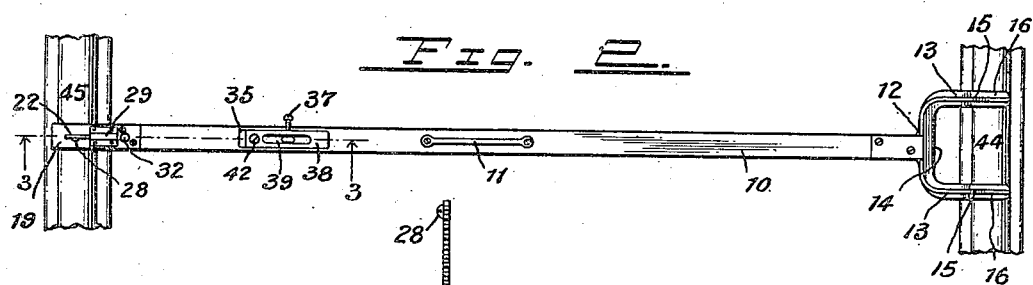
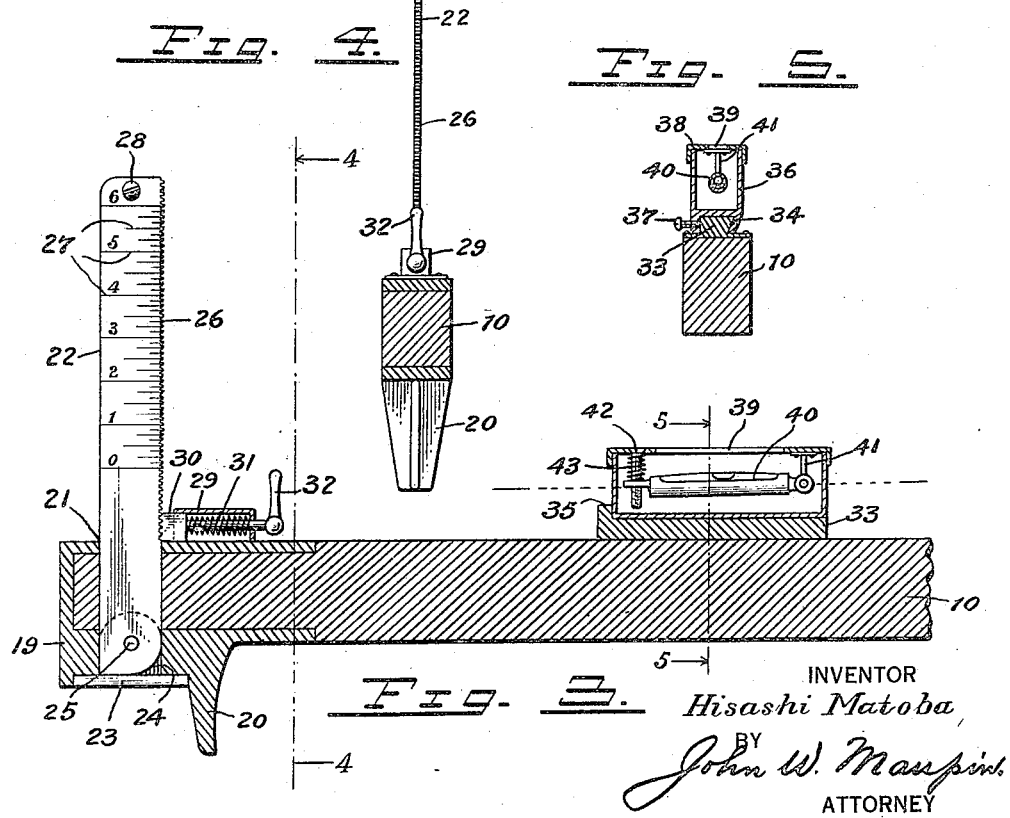

1,410,491.

Patented Mar. 21, 1922.
2 SHEETS—SHEET 2.

INVENTOR
Hisashi Matoba
BY John W. Maupin
ATTORNEY

UNITED STATES PATENT OFFICE.

HISASHI MATOBA, OF SEATTLE, WASHINGTON.

TRACK GAUGE AND LEVEL.

1,410,491.        Specification of Letters Patent.    Patented Mar. 21, 1922.

Application filed July 18, 1921. Serial No. 485,768.

*To all whom it may concern:*

Be it known that I, HISASHI MATOBA, a subject of the Emperor of Japan, and a resident of Seattle, in the county of King and State of Washington, have invented an Improvement in Track Gauges and Levels, of which the following description, in connection with the accompanying drawings, is a specification, like characters on the drawings representing like parts.

This invention relates to track gauges and levels that are adapted for determining the gauge and level of railway and other tracks and is an improvement over my Patent No. 1,329,197 allowed January 27 1920.

An object of my invention is to provide a combined track gauge and level by means of which the gauge of a track can be readily determined independently of the operation of the device as a level.

Another object is to provide a combined track gauge and level whereby the level, or the difference in elevation between the rails of a track at any point, can be easily and quickly determined at sight.

A further object is to provide a combined track gauge and level by means of which the gauge and level, or the relative difference in elevation between the rails of a track, may be determined by a simple operation when laying a new track or in resetting the rails of an old track.

Still further objects of the invention are to provide a combined track gauge and level that is simple and compact in design, light in weight, durable in construction, and which can be manufactured at comparatively small cost.

With the above and other objects in view which will appear as the description proceeds, the invention consists of the novel construction, adaptation, arrangement and combination of parts hereinafter more fully described and claimed.

These objects are accomplished by devices illustrated in the accompanying drawings, wherein—

Figure 1 is a view in side elevation of a track gauge and level, embodying the features of the invention, applied to the rails of a track;

Fig. 2 is a top plan view of the same;

Fig. 3 is an enlarged fragmentary detail view in longitudinal vertical section taken on a broken line 3, 3 of Fig. 2;

Fig. 4 is a view in transverse vertical section taken on a broken line 4, 4 of Fig. 3;

Fig. 5 is a view in transverse vertical section taken on a broken line 5, 5 of Fig. 3;

Figure 6:
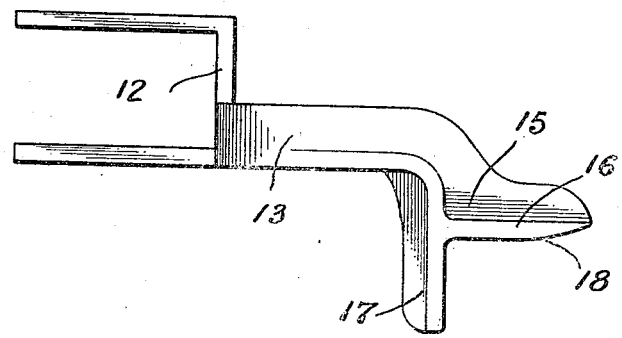
Fig. 6 is an enlarged detail view in side elevation of a track engaging member.
Figure 7:
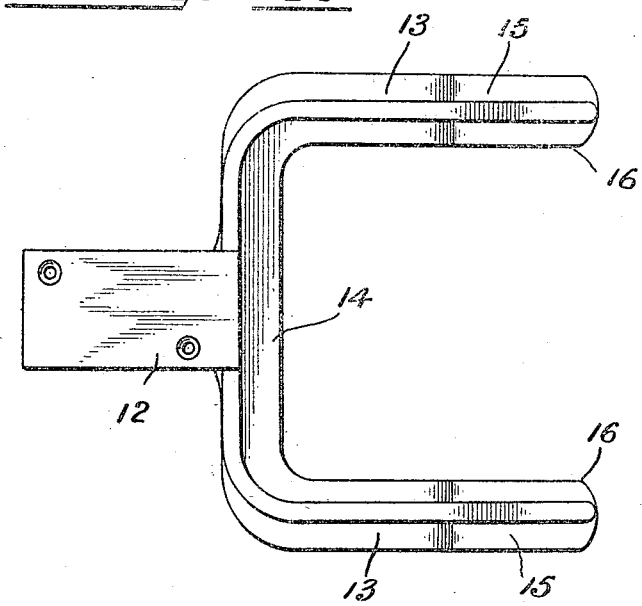
Fig. 7 is a top plan view of Fig. 6.

Referring to the drawings, throughout which like reference numerals designate like parts, the numeral 10 designates a beam which is substantially rectangular in cross section and preferably constructed of wood or other light material. A handle 11 is secured to the upper side approximately at the center of gravity of the device.

The beam 10 is reduced at one end to receive the flanges of a U-shaped bracket 12. The legs 13 of said bracket are fixedly disposed in spaced apart relation by an integrally spreader member 14. Shoes 15 are formed on the outer end portions of said legs comprising foot members 16 and depending heel members 17. The under sides of said foot members are curved outwardly and upwardly, as clearly shown at 18 in Figs. 1 and 2 of the drawings, for reasons more fully hereinafter described.

The beam 10 is likewise reduced at its opposite end to receive the flanges of an L-shaped bracket 19. Said bracket is provided with a downwardly projecting heel 20 similar to the heel 17 except that its track-engaging face and sides converge downwardly as shown in Figs. 1, 3 and 4.

It will be understood that the heel members 17 and 20 are the gauge members proper and that the distance between their outer faces is the gauge or width of the track to be determined.

As shown in Fig. 3, an opening 21 extends through the beam 10 and flanges of the bracket 19 and a scale bar 22, constituting the vertical measuring element, is slidably mounted therein. A base plate 23 having a lug 24 projecting upwardly therefrom is pivotally secured to the lower end portion of said scale bar as at 25. The inner edge portion of said scale bar is provided with serrations 26 and suitable graduations 27 are inscribed on the sides thereof having indicating numerals to designate the relative differences in elevation thereon. A stop 28 is provided at the upper end of said scale bar to limit the downward movement of same.

A housing 29 is secured upon the upper side of the bracket 19 having mounted therein a keeper 30 normally held in engagement with the serrations 26 by a spring 31. Said keeper is provided exteriorly of said housing with a handle 32 by means of which same may be disengaged from the serrations 26.

Intermediately of the bracket 19 and handle 11 a key plate 33 is secured to the upper side of the beam 10 having one of its sides beveled as at 34 and a shoulder 35 is formed on one of its ends. A casing 36 having a complementary recess formed within its lower side is adapted to slidably fit over the key plate 33 and is held thereon in engagement with the shoulder 35 by a set screw 37. A cover plate 38 is detachably secured to the top of the casing 36 having a sight opening 39 therein.

A spirit level 40 is mounted within the casing 36 having one of its ends pivotally secured to a standard 41 which is fastened at its upper end to the cover plate 38. The opposite end of said spirit level is secured to an adjusting screw 42 which is held against loose movement by a spring 43.

The beam 10 is upwardly offset from the track-engaging members so that it will clear all rails, frogs and the like when used at track crossings and other intersections. The vertical plane of the outer or track-engaging surfaces of the heel members 17 is disposed at right angles to the beam 10 and there is sufficient spread between said heel members to insure a substantial engagement with the rail 44 of the track whereby a correct rectangular measurement may be obtained between the rails when the device is used as a gauge. The undersides of the foot members 16 are curved outwardly and upwardly as shown at 18 in Figs. 1 and 2 so that a constant contact will obtain between said foot members and the upper surface of the head of the inner or lower rail when ordinarily gauging the distance between rails on a curved track. The outer or track-engaging surface of the heel 20 is beveled downwardly and inwardly so that same will clear the outward flare of the rail head 45 and more particularly when same is placed in engagement with the outer and upper rail on a curved track.

The spirit level 40 is normally mounted within the casing 36 so that its longitudinal axis is parallel with a line drawn from the upper surface of the rail head 44 to the lower end of the heel member 20 as indicated by dotted lines in Fig. 1. The lowermost or zero graduation of the scale bar 22 begins at a distance above the upper surface of the beam 10 equal to the distance between the upper surface of the rail head 45 and the lower end of the heel member 20 as indicated by brackets "a" and "b" in Fig. 1 when said scale bar is in its uppermost position. By lowering the scale bar so that the zero graduation will register flush with the upper surface of the beam 10 the lower surface of the base plate 23 will lie in the same plane with the lower end of the heel member 20 and it will be obvious that the device can then be used as a level on tracks of variable gauge when the bubble is brought to the center of the spirit level tube.

It will likewise be apparent that the superelevation of the outer rail on curved tracks may be readily determined by the difference in elevation between the horizontal plane as shown on the scale bar. This feature is particularly advantageous in laying new track, and the base plate 23 is pivotally secured to the scale bar 22 so that same will be self regulatory in cases of excessive difference in elevation between the rails. Any predetermined difference in elevation between the rails may be set on the scale bar and the spirit level adjusted accordingly. The spirit level and its casing may be readily removed from the device when its use is not required and carried for protection so that its adjustment will not be disturbed.

From the foregoing description taken in connection with the accompanying drawings the form of construction and method of operation of the device will be readily apparent to those skilled in the art to which the invention relates, and, while the principle of operation of the invention together with the device which is now considered to be the best embodiment thereof has been described, it will be understood that the apparatus shown is merely illustrative and that such changes may be resorted to as are within the scope and spirit of the invention.

What I claim is:

1. A track gauge and level comprising a beam, depending track-engaging members fixedly secured to said beam, a spirit level slidably and detachably mounted on said beam with its normal axis disposed at an angle with the normal longitudinal axis thereof, a vertically arranged measuring element adjustably carried by said beam, and a track-engaging base plate pivotally secured to the lower end of said measuring element.

2. A track gauge and level comprising a beam, depending track-engaging elements fixedly secured to each end portion of said beam, depending gauge members on said track-engaging elements, one of said gauge members having its outer track-engaging face beveled downwardly and inwardly, the opposite track-engaging element having its under face curved outwardly and upwardly, a spirit level slidably and detachably mounted on said beam with its normal axis disposed at an angle with the normal longitudinal axis thereof, a vertically arranged measuring element adjustably carried by said beam, and a track-engaging base plate pivotally secured to the lower end of said measuring element.

3. A track gauge and level comprising a beam, depending track-engaging elements fixedly secured to each end portion of said beam, depending gauge members on said track engaging elements, one of said gauge members having its outer track-engaging face beveled downwardly and inwardly, the opposite track-engaging element having its under face curved outwardly and upwardly, an adjustable spirit level slidably and detachably mounted on said beam with its normal axis disposed at an angle with the normal longitudinal axis thereof, a vertically arranged measuring element adjustably carried by said beam, a track-engaging base plate pivotally secured to the lower end of said measuring element, and means for holding said measuring element in a plurality of predetermined positions.

4. A track gauge and level comprising a beam, depending track-engaging elements fixedly secured to each end portion of said beam, depending gauge members on said track-engaging elements, one of said gauge members having its outer track-engaging face beveled downwardly and inwardly, the opposite track-engaging element having its under face curved outwardly and upwardly, an adjustable spirit level slidably and detachably mounted on said beam with its longitudinal axis normally disposed in parallel with a line extending from the lower end of one of said depending gauge members to the under track-engaging surface of the opposite track-engaging element, means for holding said spirit level in a plurality of adjusted positions, a vertically arranged measuring element slidably mounted within a slot at one end portion of said beam, a track-engaging base plate pivotally secured to the lower end portion of said measuring element, and means for holding said measuring element in a plurality of predetermined positions to coincide with the adjusted positions of said spirit level.

HISASHI MATOBA.